US006250679B1

(12) United States Patent
Schnell (10) Patent No.: US 6,250,679 B1
(45) Date of Patent: Jun. 26, 2001

(54) AIRPORT VEHICLE FRAME ASSEMBLY USED THEREFORE

(75) Inventor: Jeffrey W. Schnell, Chippewa Falls, WI (US)

(73) Assignee: NMC Wollard, Inc., Eau Claire, WI (US)

( * ) Notice: Subject to any disclaimer, the term of this patent is extended or adjusted under 35 U.S.C. 154(b) by 0 days.

(21) Appl. No.: 09/405,336

(22) Filed: Sep. 24, 1999

(51) Int. Cl.$^7$ ................................................. B62D 21/00
(52) U.S. Cl. ......................... 280/800; 280/785; 296/35.1
(58) Field of Search .................................. 280/800, 781, 280/798, 799, 785; 180/311, 312; 296/204, 185, 35.1

(56) References Cited

U.S. PATENT DOCUMENTS

| | | | |
|---|---|---|---|
| D. 176,040 | 11/1955 | Schafler et al. .................. | D14/3 |
| D. 315,325 | 3/1991 | Legueu ............................ | D12/96 |
| D. 327,456 | 6/1992 | Sacco et al. ..................... | D12/96 |
| D. 349,265 | 8/1994 | Patton ............................. | D12/14 |
| D. 425,446 * | 5/2000 | Schnell ........................... | 180/311 |
| 1,475,332 | 11/1923 | Wales ............................. | 296/204 |
| 1,872,506 | 8/1932 | Sage . | |
| 1,872,671 | 8/1932 | Beck et al. . | |
| 2,494,945 | 1/1950 | Huntington .................... | 180/71 |
| 3,450,282 * | 6/1969 | Ezolt . | |
| 3,451,571 | 6/1969 | Brisson ........................... | 214/516 |
| 3,534,977 * | 10/1970 | Wessel . | |
| 3,570,503 * | 3/1971 | DeBoliac . | |
| 3,580,611 | 5/1971 | McNitt ............................. | 280/433 |
| 3,894,749 | 7/1975 | Kozuh . | |
| 3,993,352 * | 11/1976 | Yamanaka ...................... | 296/35.1 |
| 4,040,640 | 8/1977 | Begg . | |
| 4,386,792 | 6/1983 | Moore et al. ................... | 280/781 |
| 4,449,748 | 5/1984 | Fiala et al. ..................... | 296/183 |
| 4,570,973 * | 2/1986 | Ewers et al. ................... | 280/800 |
| 5,005,864 * | 4/1991 | Chachere ....................... | 280/800 |
| 5,114,183 | 5/1992 | Haluda et al. .................. | 280/781 |
| 5,131,714 | 7/1992 | Evans et al. ................... | 296/183 |
| 5,149,132 | 9/1992 | Ruehl et al. ................... | 280/800 |
| 5,301,997 | 4/1994 | Cudden .......................... | 296/183 |
| 5,308,115 * | 5/1994 | Ruehl et al. ................... | 280/785 |
| 5,338,101 * | 8/1994 | Colip ............................. | 280/800 |
| 5,634,663 | 6/1997 | Krupp et al. ................... | 280/800 |
| 5,718,048 | 2/1998 | Horton et al. ................. | 29/897.2 |
| 5,855,394 * | 1/1999 | Horton et al. ................. | 280/781 |

OTHER PUBLICATIONS

Wollard TWS–402 Portable Water Service Truck, brochure, 2 pages.
NMC/Wollard sales brochure, 2 pages.
NMC/Wollard, Model 100 Tow Tractor sales brochure, 2 pages.
GSE (Ground Support Equipment) Today, Jul. 1997, pp. 38–40.

* cited by examiner

Primary Examiner—Kenneth R. Rice
Assistant Examiner—Lynda Jasmin
(74) Attorney, Agent, or Firm—Anthony J. Bourget (57) ABSTRACT

A vehicle adapted for exclusively off-road operation and particularly useful as an airport ground support vehicle. The vehicle having an intermediate gross vehicle weight capacity generally in the range of approximately 6,000 to approximately 15,000 pounds. The vehicle having a frame for receiving a variety of vehicle accessories, such as a lavatory service tank, water service tank, maintenance lift or the like, and having a cab-portion for housing an operator of the vehicle located rearward of an engine. The vehicle including a drive train powered by the engine for powering the wheels of the vehicle, where the drive train, frame and engine are adapted to provide the vehicle with the intermediate gross vehicle weight capacity. The frame assembly may include a reinforced ramp resulting in the rear portion of the frame assembly having increased strength for supporting heavy loads while the front portion of the vehicle has lower profile accommodating ease of entry, exit and maneuverability.

13 Claims, 7 Drawing Sheets

AIRPORT VEHICLE FRAME ASSEMBLY USED THEREFORE

FIELD OF THE INVENTION

This invention relates to load carrying vehicles for use in an off-roadway setting, and particularly load carrying vehicles of intermediate size used as airport ground support equipment (GSE) or airport transport vehicles.

BACKGROUND OF THE INVENTION

There are a variety of vehicles which exist in the industrial setting for use in hauling loads or heavy components. Of particular popularity are vehicles used in the airport ground support industry for transporting equipment special to that industry. As there are a variety of components for use in the airport ground support industry, it is preferred to have a single vehicle which can support a multitude of such components. These components, or loads, may include, for example, lavatory service tanks, water service tanks, passenger stairs, maintenance lifts, flatbeds, fuel tanks, etc. Use of a vehicle that can handle components of high weight is an important factor, as well as having a vehicle that is durable to withstand the abusive rigors in such an industrial environment.

Vehicles presently used in the GSE industry include those of the variety that are also employed in the on-road environment. Many of the features of on-road vehicles are not attractive for use in the industrial and/or GSE industry. On-road vehicles bring high cost in maintenance, especially those having elaborate systems required for compliance with various standards and regulations for on-road classification. Commonly, manufacturers of on-road vehicles make design modifications year by year, thus requiring an enormous stock of replacement parts for maintenance which adds to the overhead of the airport ground supporter or other industrial user.

In designing on-road vehicles, a focus is on complying with governmental regulations and standards, necessitating use of complex components for specialized fuel, exhaust and ignition systems, microprocessor controlled transmissions, and structural designs to lessen the weight of the vehicle to comply with fuel economy. In doing so, many on-road vehicles incorporate the use of plastic or light gauge sheet metal body components that are susceptible to damage in the industrial environment. Moreover, on-road vehicles require sophisticated and high powered engines to maintain highway velocity, whereas in most industrial and/or airport settings the maximum speed requirement is approximately 20 miles per hour in ramp areas and around aircraft, and 35 miles per hour on outer airport service roads. High power engines are not necessarily needed where transport is about a relatively horizontal surface such as a paved airfield. Many conventional vehicles that are capable of carrying loads in the 5,000 to 9,000 pound range may be too large to fit under aircraft.

Off-road vehicles used in the industrial context are generally extremely large hauling mechanisms or low-weight machines, leaving a substantial void for an intermediate weight transport vehicle. Moreover, in many industrial contexts, and especially the airport GSE industry, it is desirable to have a cab portion for transporting more than a single individual so multiple tasks may be accomplished once the vehicle reaches the desired location. For instance, one worker may load baggage while the other refills tanks or performs some other tasks. Having a cab that is easily accessible and configured to accommodate multiple persons is a desire. Also safely positioning the operators within the cab is important in an industrial setting, especially when common on-road features regarding safety compliance (i.e., airbags, crumple zones, etc.) are not possible, practical, required, contemplated or desired.

The frame or frame assembly of a vehicle used in such off-road environment or GSE setting is an important aspect of the vehicle. Some particular frames as used in vehicles, including frames used in vehicles in on-road environments, generally lack features to accommodate for intermediate load carrying ability in an off-road setting while providing lowered profile, and require complicated or expensive manufacturing. Examples of some such frames include those shown in the following patents: U.S. Pat. No. 1,475,352 to Wales; U.S. Pat. No. 1,872,506 to Sage; U.S. Pat. No. 1,872,671 to Beck, et al.; U.S. Pat. No. 3,534,977 to Wessel; U.S. Pat. No. 4,040,640 to Begg; U.S. Pat. No. 4,386,792 to Moore, et al.; U.S. Pat. No. 5,114,183 to Haluda, et al.; U.S. Pat. No. 5,149,132 to Ruehl; U.S. Pat. No. 5,634,663 to Krupp; U.S. Pat. No. 5,718,048 to Horton, et al. The unique structure of the present frame, however, results in a specially functioned frame for better use in the off-road environment.

Accordingly, among the objects of the present invention is to provide an off-road vehicle which has an intermediate gross vehicle weight capacity; which does not contain sophisticated systems commonly needed for on-road use; which may be configured with a variety of vehicle accessories, including a variety of accessories for airport ground support; which requires low maintenance combined with high-load capacity and maximum configurability; which allows for multiple passenger transport and ease of entry, as well as a low profile for traveling among and beneath other industrial equipment including other airport GSE vehicles and airplanes. Further objects of the present invention include providing a load supporting member and a frame assembly to accommodate the aforementioned objects.

SUMMARY OF THE INVENTION

In accordance with the invention, there is provided an off-road vehicle having a frame for receiving a variety of vehicle accessories, as well as receiving basic engine and drive train systems together with a cab portion. The frame, engine and drive train are adapted to provide the vehicle with an intermediate gross vehicle weight capacity (i.e., between approximately 6,000 and approximately 15,000 pounds). With such capacity, the vehicle can support the designated load even when the accessory is fully loaded. The vehicle is adapted for exclusively off-road operation. As an off-road vehicle, the vehicle will not be used on public roadways, highways, streets, or other travelways requiring certification of various governmental bodies, including the federal government. Avoiding compliance with such standards lessens the cost of purchase and maintenance, while increasing reliability, and simplicity of use. There is provided a vehicle for avoiding elaborate on-road systems while having an intermediate gross vehicle weight capacity together with the ability to support a variety of vehicle accessories. Such vehicle further maintains a low profile for effective ingress and egress of multiple passengers, together with maneuverability among other industrial equipment.

A further aspect of the invention includes a frame assembly for use in an off-road vehicle having an intermediate gross vehicle weight capacity. The frame assembly includes a lowered front-end portion to accommodate the engine and cab system of the off-road vehicle. In a specific embodiment, the frame assembly includes bridging means to bridge together the front-end and the rear-end. Such frame assembly allows for higher rear-end load capacity while allowing for lower front-end profile. The intermediate gross vehicle weight capacity is between approximately 6,000 and 15,000 pounds, with a preferred capacity of approximately 15,000 pounds. A further embodiment incorporates the frame assembly within an off-road vehicle.

Yet a further aspect of the invention includes a load supporting structural member comprising a front portion having a top piece, a side piece having a front height, and a bottom piece. The front portion is adapted for receiving an engine and a cab assembly of an off-road vehicle. The load supporting structural member further includes a rear portion having a top part, a side part having a rear height, and a bottom part. The rear portion is integrally connected to the front portion, and the rear height is greater than the front height. The rear portion is adapted for receiving an accessory of the off-road vehicle. The load supporting structural member may be included in an off-road vehicle being adapted to provide the vehicle with an intermediate gross vehicle weight capacity.

The features, benefits and objects of this invention will become clear to those skilled in the art by reference to the following description, claims and drawings.

DETAILED DESCRIPTION OF THE PREFERRED EMBODIMENTS

Figure 1:
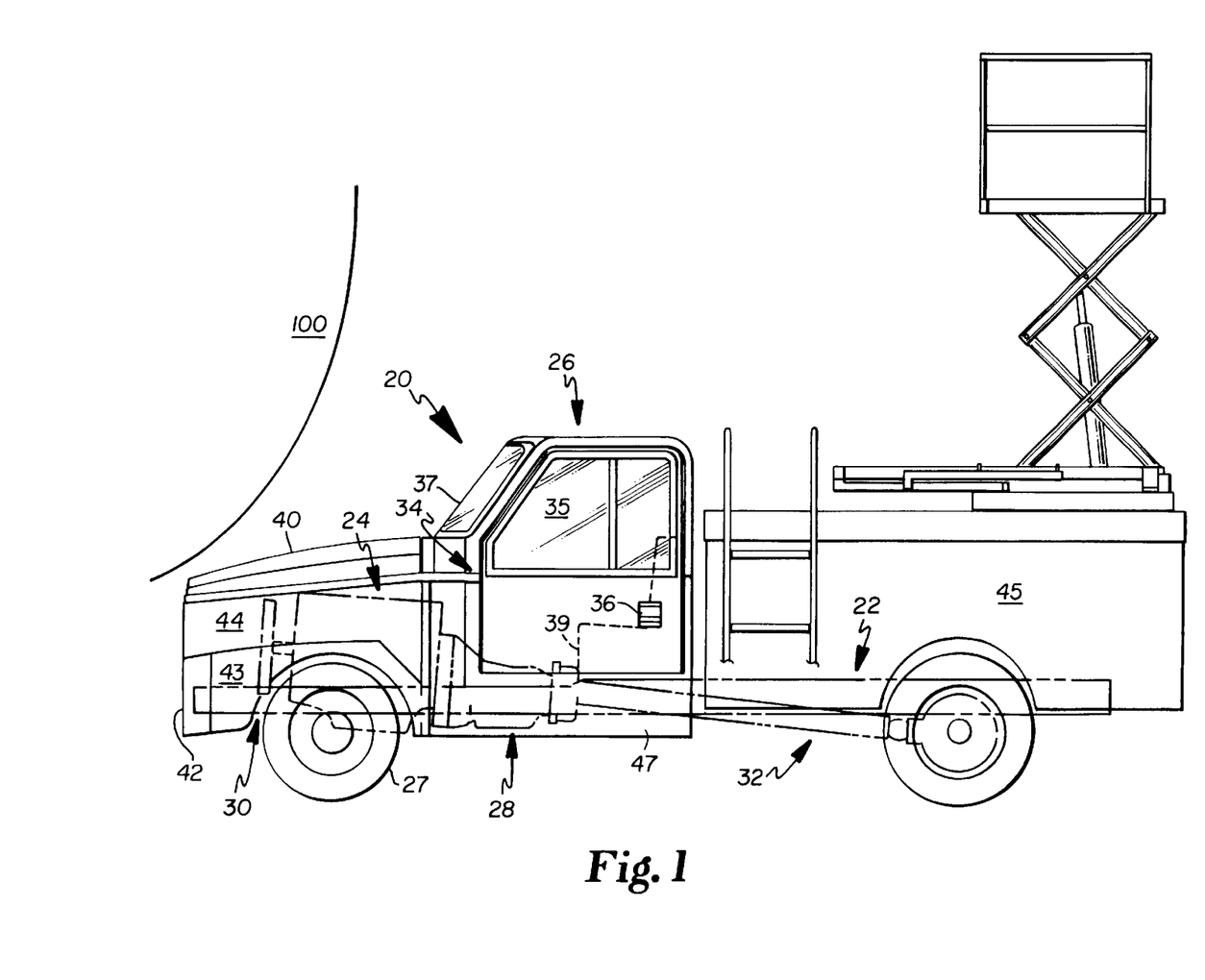
FIG. 1 is a side view of the off-road vehicle of the present invention having a maintenance lift accessory and positioned next to an aircraft body.

Referring to FIG. 1, an off-road vehicle 20 is adapted for exclusively off-road use in that it lacks features required for compliance with on-road standards and requirements. Particularly, off-road vehicle 20 includes engine 24 which is of the standard industrial variety in that engine 24 need not comply with high power or acceleration ratings or fuel economy items. Off-road vehicle 20 also includes frame 22 which is made of steel, preferably of ¼ inch stock, and need not be configured to assist vehicle 20 for on-road compliance. For instance, minimal focus need be place on manufacture of a light weight frame where there is no requirement or restriction for establishing high gas mileage or special crash test ratings. Thus, special and expensive molds need not be employed, unlike in the instant case, where frame 22 includes basic C-channel steel members having various steel cross members. Vehicle 20 further includes a cab portion 26 and a drive train 28. Drive train 28 is connected to and powered by engine 24 so that wheels 27 of the vehicle 20 may operate. Cab portion 26 is located rearwardly of engine 24. Cab portion 26 includes door 34 having window 35. Window 35 is preferably of the sliding variety. A sliding window is more durable and easier to repair and maintain as opposed to a roll-up or crank variety. An additional and identical door (not shown) is positioned on the cab 26 opposite door 34 so that double entry and exit are available for operators or passengers. Door 34 is made of heavy construction having a simple hinge connection for ease of maintenance and repair, and having the strength to withstand jet blast. The hinge connection preferably includes two hinges of a common pin and barrel variety. Door 34 may be quickly removed for warm weather operation. The distance from door to door, measured from inside cab 26, is preferably 67 inches. A single-cushion or bench type seat 39 is preferably provided within cab 26 which allows passengers to slide easily from one end of cab 26 to another for optional entry/exits. Seat 39 also accommodates persons of various size to fit comfortably within the cab 26, whereas use of separate seats might not properly accommodate all users. Seat 39 preferably spans a distance of approximately 60 inches, thus allowing the cab 26 to hold three persons in a side-by-side configuration. Seat 39, together with an absence of obstructions, such as a protruding engine within cab 26, allows users to move freely about cab 26. Cab 26 may hold more than one person in a side-by-side arrangement (i.e., where there are no barriers between persons).

Cab portion 26 further includes handle 36, windshield 37, and a rear window. Windshield 37 is preferably of a single pane construction. An optional top window may be included for assisting operation, especially when positioning the vehicle beneath airplanes. Vehicle 20 includes hood 40 which is hinged to cab 26 with hinges. Vehicle 20 includes front bumper/grill 42 preferably made of ½ inch steel. Fenders 43 and running boards 47 are preferably made of ¼ inch steel. Side panels 44 are also included, yet may be of lesser thickness as they are not exposed to as frequent or severe forces. Use of the above mentioned steel provides for a substantially rugged impact resistant construction, particularly useful in the industrial environment and in carrying heavy loads.

Frame 22 has a front end 30 and a rear end 32 located at opposing ends, and is generally a ladder-shaped structure (as also shown in subsequent embodiments). Rear end 32 is configured for receiving a variety of vehicle accessories, including a lavatory service tank, water service tank, passenger stair, maintenance lift 45, flatbed, fuel tank or other similar accessory. As such, it can be appreciated that the vehicle may be used as an airport ground support vehicle. The frame 22, engine 24, and drive train 28 are adapted to provide the vehicle 20 with an intermediate gross vehicle weight capacity. Such capacity is between approximately 6,000 and approximately 15,000 pounds and is preferably 15,000 pounds. Use of a basic industrial engine, such as a Ford CS6-649 gasoline or Cummins 4BT39 diesel/jet fuel or other similar industrial engine further reduces maintenance problems and lessens the need to have on-hand complicated or numerous replacement parts, especially when required to accommodate engine types that are modified year-by-year. Such industrial engines are common to other types of GSE vehicles. This further reduces spare parts inventory. It also reduces repair costs because of the mechanic's familiarity with such engines. Vehicle 20 combines the low maintenance engine features with a wide range of compatibility for accessories, thus producing a vehicle also capable of carrying loads of up to approximately 9,000 pounds. The weight of the off-road vehicle 20 is preferably approximately 5,700 pounds, and if equipped with a flat-bed accessory, is approximately 6,000 pounds. The intermediate gross vehicle weight capacity falls between approximately 6,000 and approximately 15,000 pounds. More particularly, under the aforementioned configuration, the off-road vehicle 20 is designed to support a variety of components upon the frame such that the gross weight capacity of vehicle 20, when combined with a fully loaded component (i.e., a full water tank), is between 6,000 and 15,000 pounds. The capacity is preferably 15,000 pounds.

Figure 2:
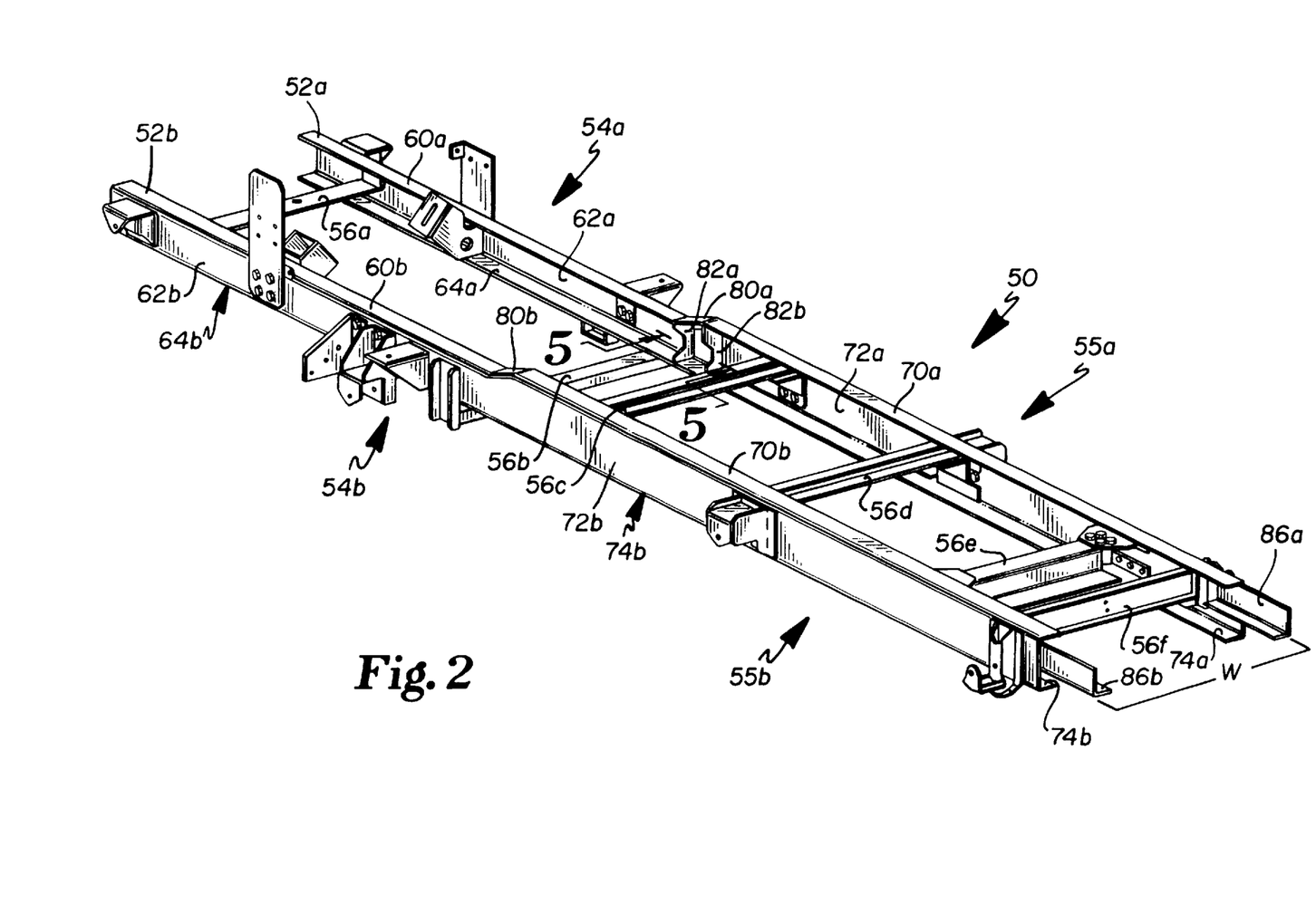
FIG. 2 is a perspective view of the frame assembly embodiment of the present invention.

A further embodiment of the invention includes a frame assembly 50 as depicted in FIG. 2. The frame assembly is a somewhat ladder-shaped structure which includes a pair of opposing C-channels 52a and 52b. The C-channels 52 are parallel to each other and connected with cross-support members 56a–56f. Each of the C-channels 52 are preferably formed of steel stock and have a C-shaped cross-section configuration. The steel stock is preferably ¼ inch thick.

The C-channels 52 mirror each other. Reference will be made primarily to the features regarding C-channel 52a, yet it will be appreciated that such features are similarly found in its mirror-imaged counterpart C-channel 52b.

Figure 3:
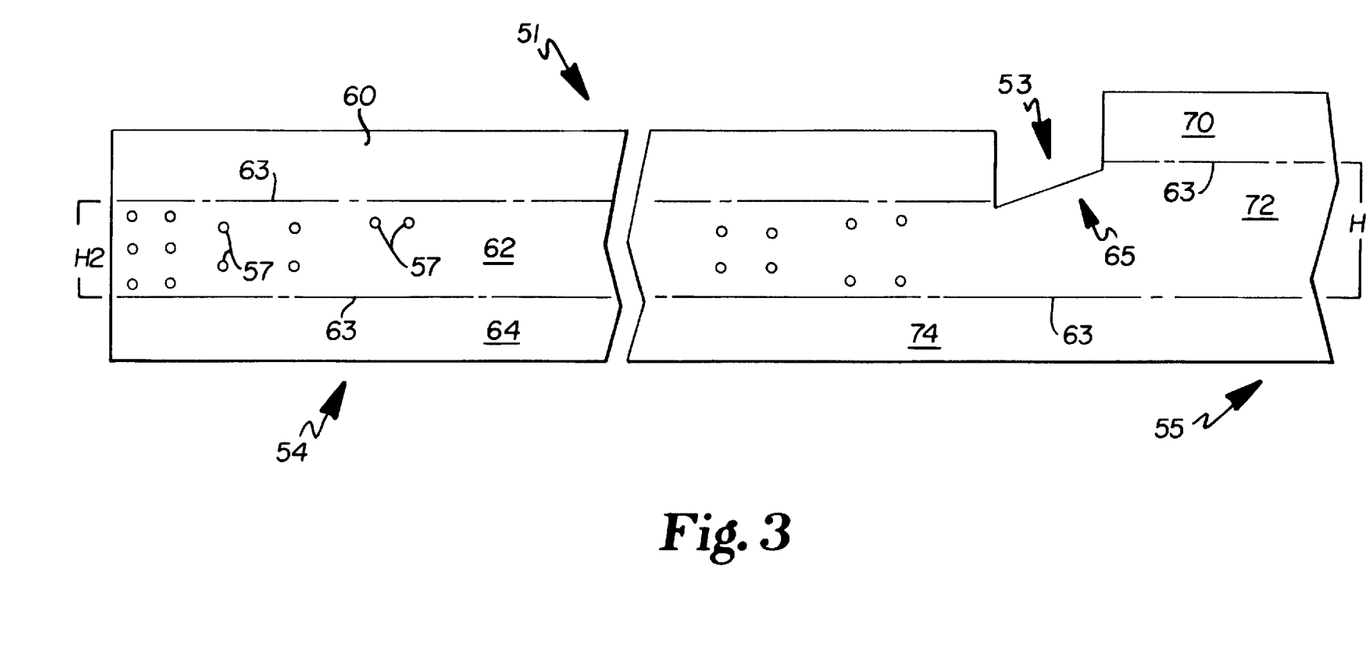
FIG. 3 is a broken front view of an unbent load supporting structural member embodiment.
Figure 4:
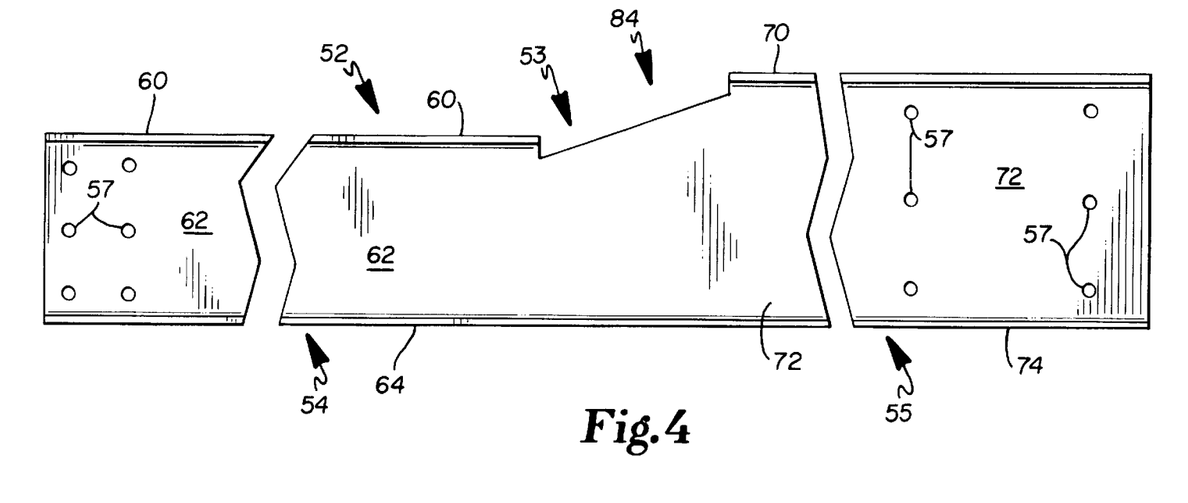
FIG. 4 is a broken front view of the frame piece of FIG. 3 in a bent configuration.

Referring to FIGS. 2 and 3, C-channel 52a includes a front portion 54a integrally connected to rear portion 55a. Front portion 54a includes a top piece 60a, side piece 62a and bottom piece 64a. Top piece 60a is configured substantially at a right angle to side piece 62a, which is configured substantially at a right angle to bottom piece 64a in order to create a frame component having a cross-sectional configuration substantially C-shaped. C-channel 52a is preferably made of ¼ inch thick steel and has a preferable length of 205 inches. C-channel 52a is made out of generally available common stock that is substantially straight (i.e., side piece 62a and side part 72a, described below, are integrally connected along the same plane). As such, a general sheet of steel stock can be used for manufacture of C-channel 52, thus avoiding expensive tooling and design typical in the creation of other types of frames, including non-straight frames. Use of a straight C-channel 52 allows for use of simple mountings for securing components to frame 50. Referring to FIG. 3, C-channel 52 originates from a flat steel sheet 51 as shown. The steel sheet 51 is bent along bend lines 63 to form C-channel 52 as shown in FIG. 4.

Referring to FIG. 3, front portion 54 defines apertures 57 for insertion of bolts to secure various brackets or other components useful in the frame assembly 50 and in the off-road vehicle of the present invention. Various brackets are used for securing, for instance, vehicle suspensions, radiators, cab parts, engine system or other components.

Referring to FIG. 2, rear portion 55a includes top part 70a, side part 72a and bottom part 74a. Top part 70a is configured substantially at a right angle to side part 72a, which is configured substantially at a right angle to bottom part 74a in order to create a frame component having a cross-sectional configuration substantially C-shaped. Rear portion 55a defines apertures for insertion of bolts to secure various brackets or other components as referenced. Rear portion 55a is adapted to accommodate an accessory used upon an off-road vehicle as described previously. Such accessories may include items such as lavatory service tanks, water service tanks, passenger stairs, maintenance lifts, flatbeds, fuel tanks or other similar accessories. Such accessories tend to be of heavy weight, especially when loaded with their respective fluids, items or people. Therefore, the strength and durability of rear portion 55a is desired. Accordingly, as shown in FIG. 3, side part 72a preferably has height H1 of eight (8) inches which provides increased strength or support to the rear portion 55a so that use of such frame assembly 50 in an off-road vehicle allows for carrying of heavy loads as described. Applicant has found that use of an 8 inch C-channel provides the added optimal rear-end strength required for obtaining an intermediate gross vehicle weight capacity. A larger C-channel, such as a 10 or 12 inch variety, would result in a less than optimal weight and cost of the vehicle, and would provide too high of a rear profile.

It is preferred that side part 72a of rear portion 55a has a rear height H1 that is greater than a front height H2 defined by side piece 62a of front portion 54a. H2 is less than H1 so that frame 50 may accommodate an engine and cab such that the engine and cab are configured at a low position relative to an accessory which may be placed on the rear portion 55a. This configuration allows for a lower cab area so a user has an easier entrance into the vehicle requiring less of a step-up for entrance or step-down for exit. Front portion 54a is adapted for receiving an engine and a portion of a cab assembly of an off-road vehicle. A portion of the cab assembly may also be positioned on rear portion 55a. The lower height of side piece 62a, and therefore of front portion 54a, results in a vehicle having lower profile for ease of transport about an industrial setting, including increased clearance for maneuvering the vehicle beneath airplanes or other ground support equipment. As addressed previously, having side part 72 of greater size provides desired strength for gross weight capacity. A further and important benefit provided by such low profile structure includes allowing vehicle 20 to be positioned in closer proximity to an airplane body 100 as shown in FIG. 1.

Side piece 62 has a preferred height H2 of six (6) inches. The strength of front portion 54a need not be as great as the strength of rear portion 55a in that the bulk of loads placed upon the vehicle are primarily absorbed by the rear portion 55a. Side piece 62 having such height has been found by applicant to be preferred also because it provides front part 54 with sufficient and optimal strength for supporting the engine parts and in contributing for the support of the cab. Applicant has found that use of a side piece 62 having greater than 6 inch dimension, such as 8 inches, would not produce the desired low profile benefits, and would add to the weight and cost of the vehicle. Side piece 62a and side part 72a are preferably integrally connected and made of the same stock of steel as shown. Bottom piece 64a and bottom part 74a are also preferably integrally connected, made of the same stock of steel, and lie along the same plane.

Figure 5:
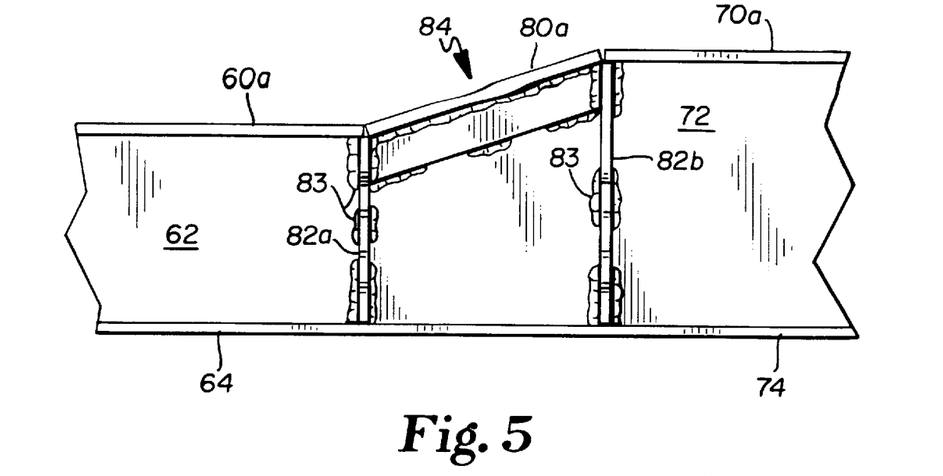
FIG. 5 is a broken front view of the frame assembly member taken along line 5—5 of FIG. 2.

As shown in FIG. 4, C-channel 52a defines ramp 84a which is an area of transition between front portion 54a and rear portion 55a. As shown in FIGS. 3 and 4, C-channel 52 defines void 53. Void 53 has been determined by applicant to cause C-channel 52 to have an area of weakness requiring reinforcement in order for frame assembly 50 to achieve its desired hauling capacity. Thus, as shown in FIG. 5, flange 80a is configured in-between top piece 60a and top part 70a in order to fill the aforementioned void 53. In such configuration, top piece 60a, top part 70a and flange 80a define reinforcing ramp 84.

Figure 6:
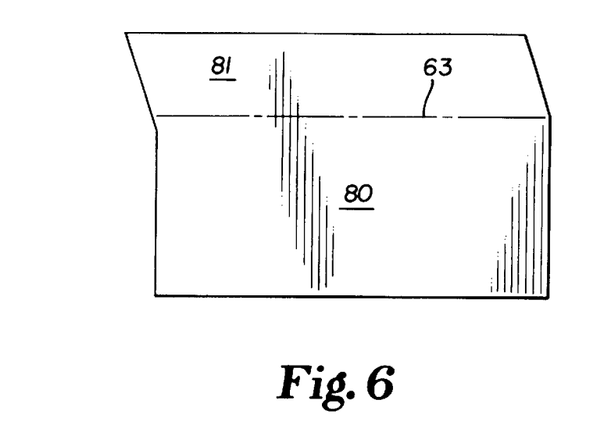
FIG. 6 is a front view of an unbent flange.
Figures 7, 8, 9:
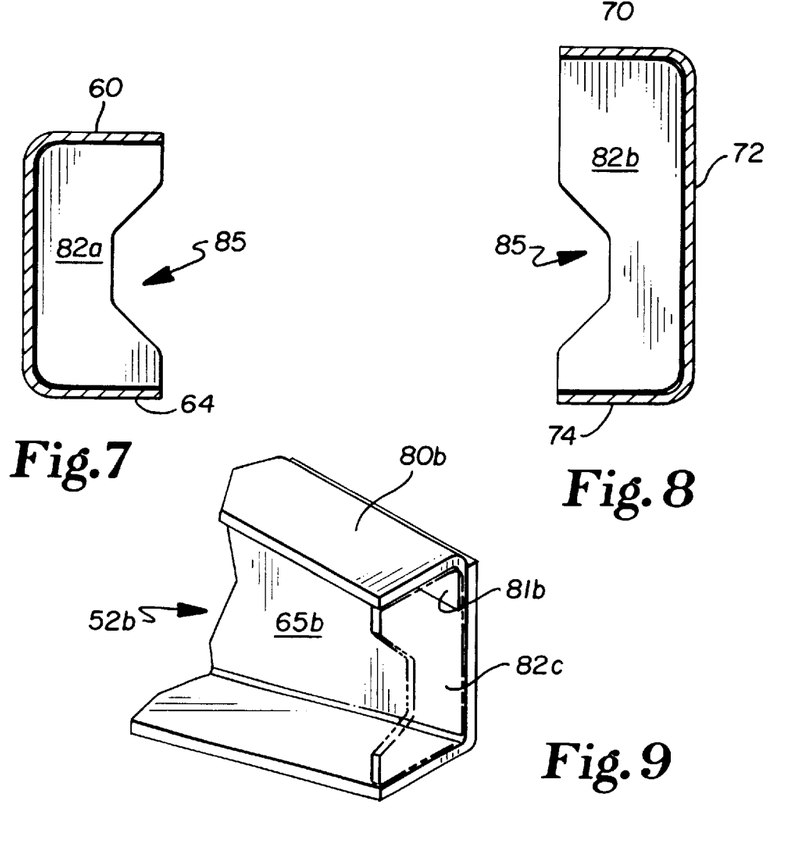
FIG. 7 is a side view of a gusset positioned within a supporting structural member.
FIG. 8 is a side view of a gusset positioned within a supporting structural member.
FIG. 9 is a broken section view showing flange piece and gusset.

As shown in FIG. 6, flange 80 is made of a flat sheet of steel stock and bent along bend line 63. Flange 80 includes flange top 81 which is bent at a substantially right angle along flange 80. As shown in FIGS. 5, 7, and 8, C-channel 52a further includes vertically-disposed gussets 82a and 82b. Gusset 82a is generally of height H2 to accommodate placement within the front portion 54a of C-channel 52a. Gusset 82b is generally of height H1 to accommodate placement within the rear portion 55a. As shown in FIG. 5, flange 80a and gussets 82 are preferably made from ¼ inch steel. Flange 80a is preferably welded into position with welds 83 as shown and operates as bridging means for bridging the top piece 60a with top part 70a. Gussets 82 may also be preferably welded with welds 83 into position and further define bridging means. The bridging means further act as means for strengthening the front portion 54a in relation to rear portion 55a. It is contemplated that bridging means may include use of similar components that are bolted or otherwise connected together, as well as use of blocks, bars, struts, or other equivalent items for bridging the front portion 54 with rear portion 55.

Flange top 81 is skewed (i.e., not rectangular) in relation to flange 80 as shown in FIG. 6. As such, flange 80, when bent, is properly positionable within void 53. Absent such skew, flange 80, when bent, would improperly contact gussets 82 so as to not fit comfortably within void 53.

Referring to FIG. 9, flange 80b is secured to C-channel 52b (opposite C-channel 52a). Gusset 82c is preferably welded into position. Flange 80b abuts and is welded upon transition piece 65b. Transition piece 65b is integral to and located between side piece 62b and side part 72b beneath void 53 (see also FIG. 3).

As shown in FIG. 7, gusset 82a defines cut-out 85. Gusset 82 having cut-out 85, as opposed to gusset 82 having an otherwise square or rectangle configuration, allows for space in which vehicle cables, hoses, or lines (not shown) may run within C-channel 52. A similar cut-out 85 is provided in gusset 82b.

Cross members 56a–56f are provided as shown in FIG. 2. Cross members 56 are generally of similar length such that when, connecting the opposing C-channels 52a and 52b, the C-channels 52 preferably maintain a parallel configuration and spacing of dimension W. Such spacing of dimension W is preferably 34 inches, which is a standard width for accommodating various vehicle components described herein. A vehicle component may be secured to the frame assembly 50 by clamping, bolting, or other means of fastening the component to the C-channels 52. Extensions 86a and 86b are an optional component, preferably made of ¼ inch thick steel in a substantially L-shaped cross section. Extensions 86a and 86b are mounted to frame assembly 50 to accommodate receipt of various vehicle components or accessories.

Various standard mounts or brackets may be affixed to C-channel 52 for use in a contemplated vehicle. Such mounts or brackets include a radiator mount, suspension or spring brackets, cab mounting brackets and engine and transmission mounting.

Figure 10:
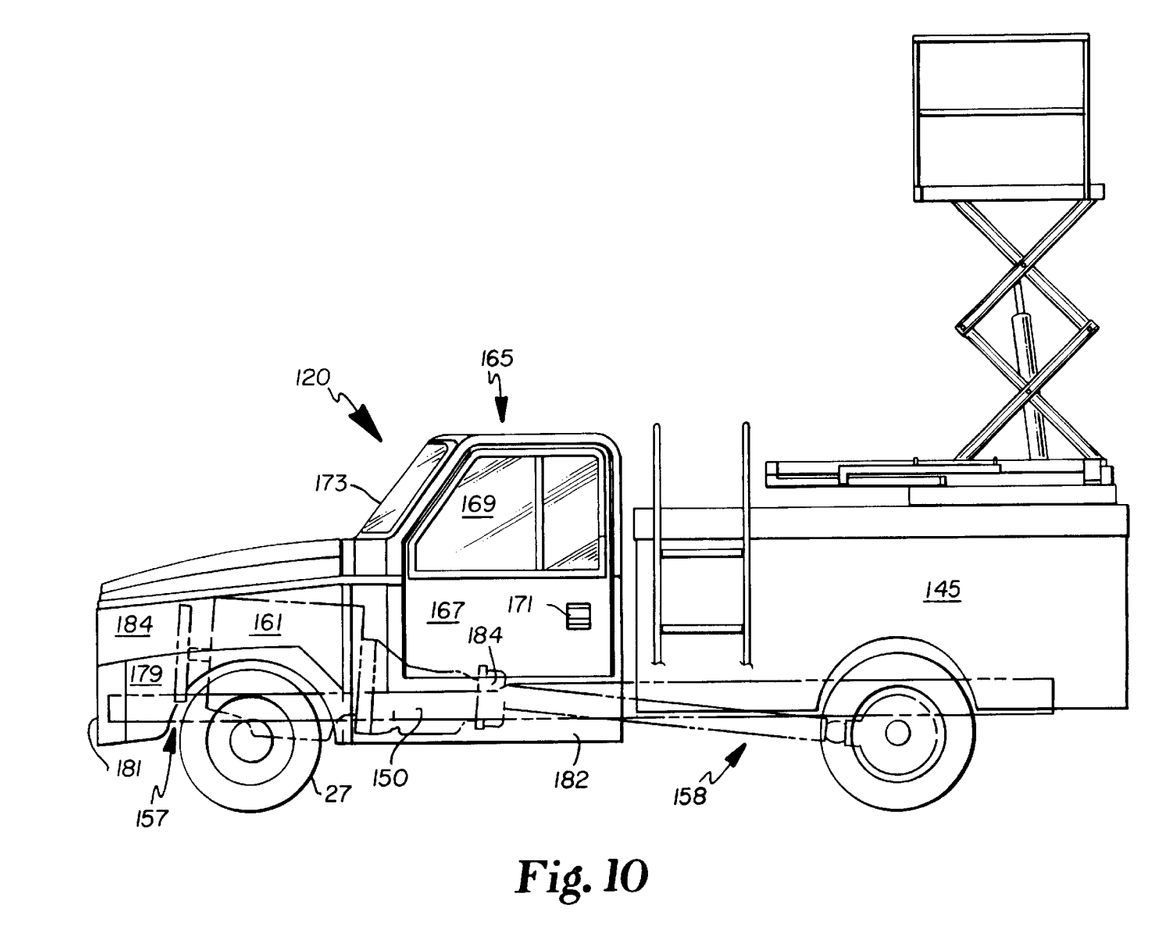
FIG. 10 is a side view of an embodiment of an off-road vehicle of the present invention.
Figure 11:
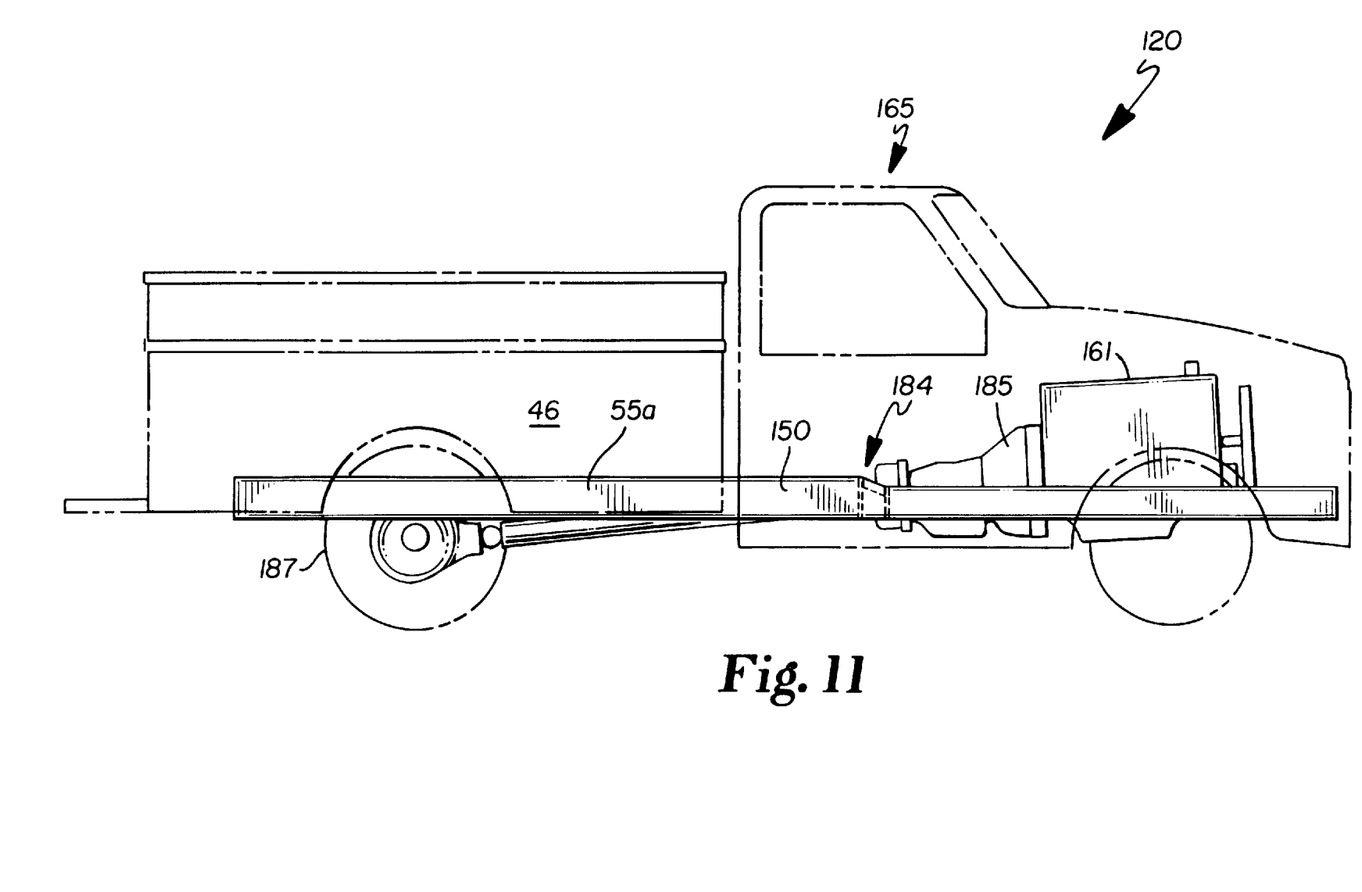
FIG. 11 is a side view of an embodiment of an off-road vehicle of the present invention.

Referring to FIGS. 10 and 11, further embodiments showing an off-road vehicle 120 which incorporate, among other items, frame assembly 150. Frame assembly 150 is preferably identical to the frame assembly 50 as described previously, and further includes front end 157 defined by the front portions 54a and 54b as shown in FIG. 2. Frame assembly 150 includes ramp 184 and bridging means for strengthening front portions with rear portions. Ramp 184 provides structure and benefits as described previously with use of frame assembly 50 (i.e., frame 150 includes corresponding flange and gussets as described). The front end 157 is adapted for a receiving an engine 161. Engine 161 is preferably of the industrial variety in that it need not be designed to meet on-road requirements such as fuel economy and power output, among others. Such engine 161 is further preferred due to its ease of use, maintenance, repair (i.e., easier to diagnose or troubleshoot for problems) and spare part supply line.

Frame assembly 150 further includes rear-end 158 defined by rear portions 55a and 55b. Rear end 158 is adapted for receiving a vehicle accessory of the type previously described including a water tank 46 (see FIG. 11), or lavatory tank with lift 145 (see FIG. 10). The front end 157 is also adapted for receiving cab portion 165. The cab-portion 165 houses an operator of the vehicle and is preferably configured to hold more than one individual. Cab-portion 165 includes door 167 having window 169. Window 169 is preferably of the sliding variety as opposed to the crank variety in order to lessen maintenance and repair (as described previously). Handle 171 may be of the pull-up or pull-out variety. Cab-portion 165 further includes windshield 173, and rear window. An optional top window can be included. Such top window is helpful in situations where an operator must look above in order to align the vehicle 120 and the vehicle accessory in position relative to airplanes etc. Cab-portion 165 is positioned rearward of the engine 161 as shown in FIGS. 10 and 11. In such position, the operator and passengers are located in a safer, less noisy area as opposed to a position where the engine would be next to, protruding into, or adjacent, the cab portion 165. Such positioning also further separates the user from engine heat. This is often an important aspect, for if the engine is mounted side by side the operator, or protruding into the cab portion 165, the operator is exposed to greater risk of injury from collision in being trapped between the engine and cab portion.

Engine 161 is housed under hood 177, together with fenders 179 and front bumper/grill 181. Front bumper/grill 181 is preferably made of ½ inch steel stock. Fenders 179 and running-board 182 are preferably made of ¼ inch steel. Side panels 184 are also included yet may be of lesser thickness as they are not exposed to as frequent or severe forces. Use of the above mentioned heavy steel provides for a substantially rugged impact resistant construction, particularly useful in the industrial environment and in carrying loads. Hood 177 is typically hinged to cab-portion 165.

The off-road vehicle 120 further includes a drive train 185 connected to and powered by engine 161 so that the wheels 187 of the vehicle 120 may operate for intended transportation. The vehicle 120 is adapted for exclusively off-road operation in that it lacks the features dictated by compliance with on-road standards and requirements. Use of frame assembly 150 allows the off-road vehicle to support heavy load amounts of up to approximately 9,000 pounds. The weight of the off-road vehicle 120 is preferably approximately 5,700 pounds, and if equipped with a flat-bed accessory (not shown), is approximately 6,000 pounds. The frame assembly 150, engine 161, cab portion 165, and drive train 185 are adapted to provide the off-road vehicle 120 with an intermediate gross vehicle weight capacity. Such capacity is between approximately 6,000 and approximately 15,000 pounds. More particularly, under the aforementioned configuration, the off-road vehicle 120 is configured to support a vehicle component such that the gross weight of vehicle 120, when combined with a fully loaded component, is between 6,000 and 15,000 pounds.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

I claim:

1. An airport ground support vehicle having an intermediate gross vehicle weight capacity, said vehicle comprising:
   a frame assembly having a pair of opposing C-channels parallely connected with at least two cross members, each of said C-channels comprising:
      a front portion having a top piece, a side piece having a front height, and a bottom piece, said front portion adapted for receiving an engine and a portion of a cab assembly of the off-road vehicle; and
      a rear portion having a top part, a side part having a rear height, a bottom part, and a gusset disposed within a C-space defined by said top part, said side part, and said bottom part, said rear portion integrally connected to said front portion, said rear height being greater than said front height, said rear portion adapted for receiving an accessory of said vehicle;
   an engine mounted to said front portion, said engine lacking standard on-road vehicle emission controls;
   whereby said engine requires minimal maintenance characteristics;
   a cab portion for housing an operator of said vehicle, said cab portion located rearwardly of said engine; and
   a drive train powered by said engine for powering wheels of said vehicle;
   whereby a vehicle accessory may be connected to said rear portion for use of said vehicle in an airport ground support function.

2. An airport ground support vehicle according to claim 1 wherein said frame assembly being adapted to provide said vehicle a gross vehicle weight capacity of between approximately 6,000 and approximately 15,000 pounds.

3. A frame assembly for use in an off-road vehicle, said frame assembly comprising:
   a pair of opposing C-channels parallely connected with at least two cross members, each of said C-channels comprising:
      a front portion having a top piece, a side piece having a front height, and a bottom piece, said front portion adapted for receiving an engine and a portion of a cab assembly of the off-road vehicle; and
      a rear portion having a top part, a side part having a rear height, a bottom part, and a gusset disposed within a C-space defined by said top part, said side part, and said bottom part, said rear portion integrally connected to said front portion, said rear height being greater than said front height, said rear portion adapted for receiving an accessory of the off-road vehicle;
   wherein said frame assembly may be incorporated into an off-road vehicle so as to provide the off-road vehicle with a low engine and cab assembly profile.

4. A frame assembly according to claim 3 wherein each of said C-channels includes a flange for bridging said top piece and said top part.

5. A frame assembly according to claim 4 wherein said gusset is positioned near said front portion.

6. A frame assembly according to claim 3 wherein each of said C-channels includes bridging means for bridging said top piece and said top part.

7. A frame assembly according to claim 3 wherein said bottom piece and said bottom part are at the same level.

8. A frame assembly according to claim 3 wherein said cross members have a predetermined cross member length such that said rear portion receives a standard width accessory.

9. A frame assembly according to claim 3 wherein said C-channels are substantially straight.

10. A frame assembly according to claim 3 wherein said rear height is approximately two inches greater than said front height.

11. A frame assembly according to claim 3 wherein said frame assembly is adapted to be included within an off-road vehicle to provide the vehicle with an intermediate gross vehicle weight capacity.

12. An off-road vehicle having an intermediate gross vehicle weight capacity, said vehicle comprising:
   a frame assembly comprising:
      a pair of opposing C-channels parallely connected with at least two cross members, each of said C-channels comprising:
         a front portion having a top piece, a side piece having a front height, and a bottom piece, said front portion adapted for receiving an engine assembly of said off-road vehicle; and a rear portion having a top part, a side part having a rear height, a bottom part, and a gusset disposed within a C-space defined by said top part; said side part, and said bottom part said rear portion integrally connected to said front portion, said rear height greater than said front height, said rear portion adapted for receiving an accessory of said off-road vehicle;
      wherein said front portions define a front end, and said rear portions define a rear end of said frame assembly;
   an engine mounted to said front end;
   a cab portion for housing an operator of said vehicle;
   a drive train powered by said engine for powering wheels of said vehicle;
   said frame assembly, said engine and said drive train adapted to provide said vehicle with an intermediate gross vehicle weight capacity; and
   said vehicle adapted for exclusively off-road operation.

13. An off-road vehicle according to claim 12 wherein said frame assembly, said engine, said drive train, and the vehicle accessory being adapted to provide said vehicle with an intermediate gross vehicle weight capacity.

* * * * *